(12) United States Patent
Kim

(10) Patent No.: US 10,289,174 B2
(45) Date of Patent: *May 14, 2019

(54) SOLID STATE DRIVE APPARATUS

(71) Applicant: Samsung Electronics Co., Ltd., Suwon-si, Gyeonggi-do (KR)

(72) Inventor: Jung-hoon Kim, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,287

(22) Filed: Mar. 15, 2018

(65) Prior Publication Data

US 2018/0203491 A1 Jul. 19, 2018

Related U.S. Application Data

(63) Continuation of application No. 15/188,424, filed on Jun. 21, 2016, now Pat. No. 9,958,914.

(30) Foreign Application Priority Data

Aug. 25, 2015 (KR) ........................ 10-2015-0119818

(51) Int. Cl.
*G06F 1/20* (2006.01)

(52) U.S. Cl.
CPC ...................................... *G06F 1/20* (2013.01)

(58) Field of Classification Search
CPC ........ G06F 1/20; G06F 1/187; G06F 12/0246; G06F 1/183; G06F 1/1658; G06F 1/181; G06F 1/186; H05K 5/0256; H05K 7/20736; H05K 7/20818; H05K 5/0069; H05K 7/2039; H05K 1/0203; H05K 5/0269; H05K 7/20409; H05K 7/20418; H05K 5/0047; H05K 7/206; H05K 7/20609; H05K 7/202; H05K 7/20163; G11B 33/1426; G11B 2220/60; G11B 33/123

See application file for complete search history.

(56) References Cited

U.S. PATENT DOCUMENTS

| 4,642,715 A | 2/1987 | Ende |
| 5,596,483 A | 1/1997 | Wyler |
| 5,731,954 A | 3/1998 | Cheon |

(Continued)

FOREIGN PATENT DOCUMENTS

| KR | 1020000032869 A | 6/2000 |
| KR | 1020140004864 A | 1/2014 |

*Primary Examiner* — James Wu
*Assistant Examiner* — Michael A Matey
(74) *Attorney, Agent, or Firm* — Muir Patent Law, PLLC

(57) ABSTRACT

A solid state drive apparatus includes a housing having a first accommodation space and a second accommodation space; a substrate mounted in the first accommodation space, wherein at least one non-volatile memory chip is mounted on the substrate; and a heat dissipation member mounted in the second accommodation space and including an isolation barrier that defines a boundary between the second accommodation space and the first accommodation space and a plurality of fin portions that extend from the isolation barrier away from the first accommodation space, wherein a plurality of through air holes are provided in a side of the housing adjacent the second accommodation space.

18 Claims, 12 Drawing Sheets

(56) References Cited

U.S. PATENT DOCUMENTS

| | | |
|---|---|---|
| 5,808,869 A | 9/1998 | Donahoe |
| 5,842,514 A | 12/1998 | Zapach |
| 5,870,247 A | 2/1999 | Schirle |
| 5,927,386 A | 7/1999 | Lin |
| 6,167,949 B1 | 1/2001 | Langley |
| 6,185,097 B1 | 2/2001 | Behl |
| 6,244,332 B1 | 6/2001 | Gesklin |
| 6,310,776 B1 | 10/2001 | Byrne |
| 6,434,000 B1 | 8/2002 | Pandolfi |
| 6,535,384 B2 | 3/2003 | Huang |
| 7,388,749 B1 | 6/2008 | Feroli |
| 7,414,838 B2 | 8/2008 | Yeh |
| 7,468,887 B2 | 12/2008 | Han |
| 7,518,859 B2 | 4/2009 | Kobayashi |
| 7,606,035 B2 | 10/2009 | Park et al. |
| 7,920,383 B2 | 4/2011 | Yang et al. |
| 8,149,583 B2 * | 4/2012 | Ishii ............... H05K 3/368 361/679.31 |
| 8,240,360 B2 | 8/2012 | Bang et al. |
| 8,537,540 B2 | 9/2013 | Landon |
| 8,787,022 B2 | 7/2014 | Moriai et al. |
| 2001/0001416 A1 | 5/2001 | Lee |
| 2004/0174673 A1 | 9/2004 | Lin |
| 2004/0218361 A1 | 11/2004 | Lin |
| 2006/0268511 A1 | 11/2006 | Jeong |
| 2008/0212297 A1 * | 9/2008 | Ni ................... G06F 12/1416 361/760 |
| 2009/0129026 A1 | 5/2009 | Baek et al. |
| 2009/0268403 A1 | 10/2009 | Chen |
| 2010/0006260 A1 | 1/2010 | Oh et al. |
| 2010/0052132 A1 | 3/2010 | Baek |
| 2011/0199748 A1 * | 8/2011 | Kagawa ........... H05K 7/20436 361/796 |
| 2014/0036435 A1 | 2/2014 | Kim |
| 2014/0117528 A1 * | 5/2014 | Byun ............... H01L 23/367 257/713 |
| 2014/0146461 A1 * | 5/2014 | Choi ............... H05K 7/20445 361/679.31 |
| 2014/0146462 A1 | 5/2014 | Coglitore |
| 2014/0306335 A1 | 10/2014 | Mataya et al. |
| 2016/0086917 A1 | 3/2016 | Byun |
| 2016/0093550 A1 * | 3/2016 | Kumagai ........... H01L 23/367 361/717 |
| 2016/0270205 A1 * | 9/2016 | Kamimura ......... H05K 1/0203 |
| 2016/0307818 A1 * | 10/2016 | Kawase ............ H01L 23/3675 |
| 2017/0023970 A1 * | 1/2017 | Kimura ............. G06F 3/0679 |

* cited by examiner

SOLID STATE DRIVE APPARATUS

CROSS-REFERENCE TO RELATED APPLICATION

This application is a continuation application of U.S. patent application Ser. No. 15/188,424; filed Jun. 21, 2016 which claims the benefit of Korean Patent Application No. 10-2015-0119818, filed on Aug. 25, 2015, in the Korean Intellectual Property Office, the disclosures of which are incorporated herein in their entireties by reference.

BACKGROUND

The present disclosure relates to solid state drives, and more particularly, to a solid state drives having a housing that accommodates electronic circuitry of the drive.

Solid state drives are next-generation storage apparatuses that are expected to replace conventional hard disk drives. The solid state drives include non-volatile memory devices. The solid state drives typically have characteristics of low power consumption and high storage density, which makes them attractive alternatives to conventional hard disk drives. Also, the use of the solid state drive as a storage device can allow fast storage and retrieval of large amounts of data. Thus increased demand for the solid state drives is expected.

However, as the capacity and/or speed of the solid state drives is increased, heat generated by the solid state drive may also increase, which can be detrimental to the operation of the solid state drive.

SUMMARY

According to an aspect of the inventive concepts, a solid state drive apparatus includes a housing having a first accommodation space and a second accommodation space; a substrate mounted in the first accommodation space, wherein at least one non-volatile memory chip is mounted on the substrate; and a heat dissipation member mounted in the second accommodation space and including an isolation barrier that defines a boundary between the second accommodation space and the first accommodation space and a plurality of fin portions that extend from the isolation barrier away from the first accommodation space, wherein a plurality of through air holes are provided in a side of the housing adjacent the second accommodation space.

The plurality of fin portions of the heat dissipation member may extend from the isolation barrier towards the lateral side of the housing around the second accommodation space.

The housing may include an upper housing and a lower housing, and the first accommodation space and the second accommodation space are between the upper housing and the lower housing, wherein the isolation barrier thermally contacts the upper housing and the lower housing.

The isolation barrier and the plurality of fin portions may be formed as a single body.

The substrate may is a printed circuit board (PCB) including a heat-conducting wiring, wherein the heat-conducting wiring of the substrate and the isolation barrier thermally contact each other.

The heat-conducting wiring of the substrate may be electrically grounded.

The solid state drive apparatus may further include a connector attached to an end of the substrate facing a first lateral side of the housing, and a controller chip mounted on the substrate to be adjacent to the end of the substrate.

The heat dissipation member may be mounted to be adjacent to a second lateral side opposite to the first lateral side of the housing.

The heat dissipation member may be mounted to be adjacent to a portion of the substrate on which the controller chip is mounted.

The isolation barrier may include a first isolation barrier and a second isolation barrier extending in different directions and connected to each other, wherein the second accommodation space is arranged at an acute angle between the first and second isolation barrier, and each of the plurality of fin portions is connected to the first and second isolation barriers.

The at least one non-volatile memory chip and the housing may thermally contact each other with a thermal interface material (TIM) therebetween.

According to another aspect of the inventive concepts, there is provided a solid state drive apparatus including a substrate on which a plurality of semiconductor chips including a controller chip and at least one non-volatile memory chip are mounted, a heat dissipation member comprising an isolation barrier facing an end of the substrate and a plurality of fin portions extending from the isolation barrier in a direction away from the substrate and a housing comprising an upper housing and a lower housing and accommodating the substrate and the heat dissipation member.

Each of the plurality of fin portions may have a planar shape and is parallel to a main surface of the substrate. In some embodiments, each of the plurality of fin portions may be perpendicular or oblique to a main surface of the substrate.

A plurality of through air holes may be provided in a side of the housing adjacent to the plurality of fin portions. The side of the housing may be a lateral side that is perpendicular to the main surface of the substrate, or may be parallel to the main surface of the substrate.

Each of the plurality of semiconductor chips may thermally contact the housing with a thermal interface material (TIM) included therebetween, and the isolation barrier may thermally contact the housing.

A solid state drive apparatus according to further embodiments includes a housing including a first compartment and a second compartment therein; a printed circuit board in the first compartment; at least one non-volatile memory chip is mounted on the printed circuit board; an isolation barrier between the first compartment and the second compartment, wherein the isolation barrier blocks air flow between the first compartment and the second compartment; a heat dissipation member in the second compartment and thermally coupled through the isolation barrier to the printed circuit board in the first compartment; and a plurality of through air holes in a side of the housing adjacent the second compartment, the plurality of through air holes permitting airflow through the second compartment.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EMBODIMENTS

Figure 1A:
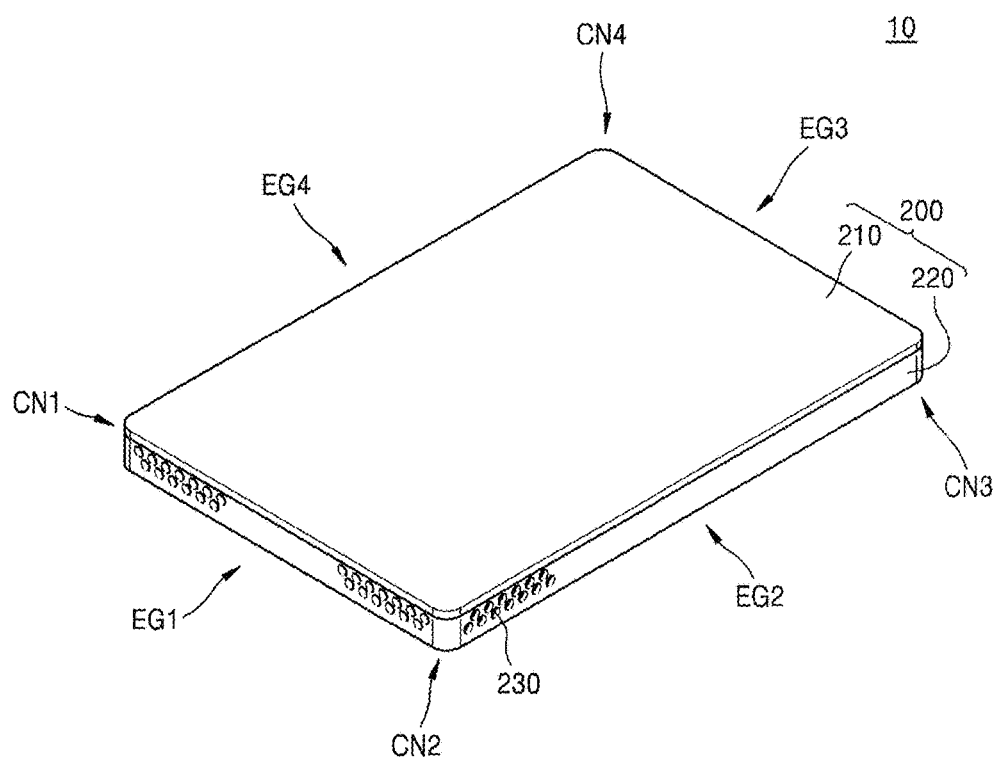
FIG. 1A is a perspective view of a solid state drive apparatus according to an example embodiment of the inventive concepts.

The inventive concepts will now be described more fully with reference to the accompanying drawings, in which example embodiments of the inventive concepts are shown. The inventive concepts may, however, be embodied in many different forms and should not be construed as being limited to the embodiments set forth herein; rather, these embodiments are provided so that this disclosure will be thorough and complete, and will fully convey the inventive concepts to one of ordinary skill in the art. In the drawings, lengths and sizes of components may be exaggerated for convenience of explanation, and a ratio between the sizes of components may be enlarged or reduced.

It will be understood that when a component is referred to as being "on" another component or as "contacting" another component, the component can be directly on or directly contact another component or intervening components may be present. In contrast, when a component is referred to as being "directly on" another component or "directly contacting" another element, there are no intervening components present. Other expressions describing relationships between components, such as, "between" and "directly between", will also be similarly understood.

While such terms as "first", "second", etc., may be used to describe various components, such components should not be limited to the above terms. The above terms are used only to distinguish one component from another. For example, a first component discussed below could be termed a second component, and similarly, a second component may be termed a first component, without departing from the teachings of this disclosure.

An expression used in the singular form encompasses the expression in the plural form, unless it has a clearly different meaning in the context. In the present specification, it is to be understood that the terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may added.

As used herein, the term "and/or" includes any and all combinations of one or more of the associated listed items. Expressions such as "at least one of," when preceding a list of elements, modify the entire list of elements and do not modify the individual elements of the list.

Unless defined differently, all terms used in the description have the same meaning as generally understood by those skilled in the art.

Hereinafter, the inventive concepts will be described more fully with reference to the accompanying drawings, in which example embodiments of the inventive concepts are shown.

Figure 1B:
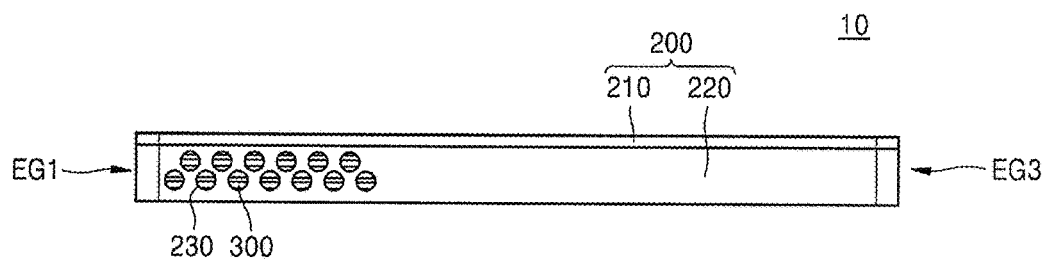
FIG. 1B is a side view of a solid state drive apparatus according to an example embodiment of the inventive concepts.

FIG. 1A is a perspective view of a solid state drive apparatus 10 according to an example embodiment of the inventive concepts. FIG. 1B is a side view of the solid state drive apparatus 10 according to an example embodiment of the inventive concepts.

Referring to FIGS. 1A and 1B, the solid state drive apparatus 10 includes a housing 200 and a heat dissipation member 300 mounted in the housing 200.

The solid state drive apparatus 10 may include first through fourth corners CN1, CN2, CN3, and CN4 and first through fourth sides EG1, EG2, EG3, and EG4. Lateral sides of the housing 200 may be the first through fourth sides EG1, EG2, EG3, and EG4. The lateral sides of the housing 200 forming the first through fourth sides EG1, EG2, EG3, and EG4 may be respectively referred to as first through fourth lateral sides.

The housing 200 may be formed of a single material or a combination of different materials, which may be selected in consideration of thermal transfer characteristics of the materials. For example, the housing 200 may be formed of a metal, a carbonic material, a polymer material, or a combination of these, but is not limited thereto. The housing 200 may be formed of, for example, copper, aluminum, stainless steel, or a clad metal including these. Alternatively, the housing 200 may be formed of a polymer material, such as an epoxy resin, polymethylmethacrylate (PMMA), polycarbonate (PC), polyethylene (PE), or polypropylene (PP).

A plurality of through air holes 230 may be formed in a lateral side of the housing 200. For example, the plurality of through air holes 230 may be formed in a lateral side of the housing 200 adjacent to the heat dissipation member 300.

The housing 200 may include an upper housing 210 and a lower housing 220. FIGS. 1A and 1B illustrate that portions of the lower housing 220 provide most of the side portions of the housing 200, but the inventive concepts are not limited thereto. For example, side portions of the housing 200 may be modified by allowing portions of the upper housing 210 to correspond to most of side portions of the housing 200, or by forming side portions of the housing 200 such that the upper housing 210 and the lower housing 210 have similar proportions.

Thus, while the plurality of through air holes 230 are illustrated as being formed in the lower housing 220, the inventive concepts are not limited thereto. For example, the plurality of through air holes 230 may be formed in the upper housing 210. Alternatively, some of the through air holes 230 may be formed in the upper housing 210, and some others may be formed in the lower housing 220. Moreover, as will be described in more detail below, one or more air holes 230 may be formed in a top surface of the upper housing 210 or a bottom surface of the lower housing 220.

Figure 2:
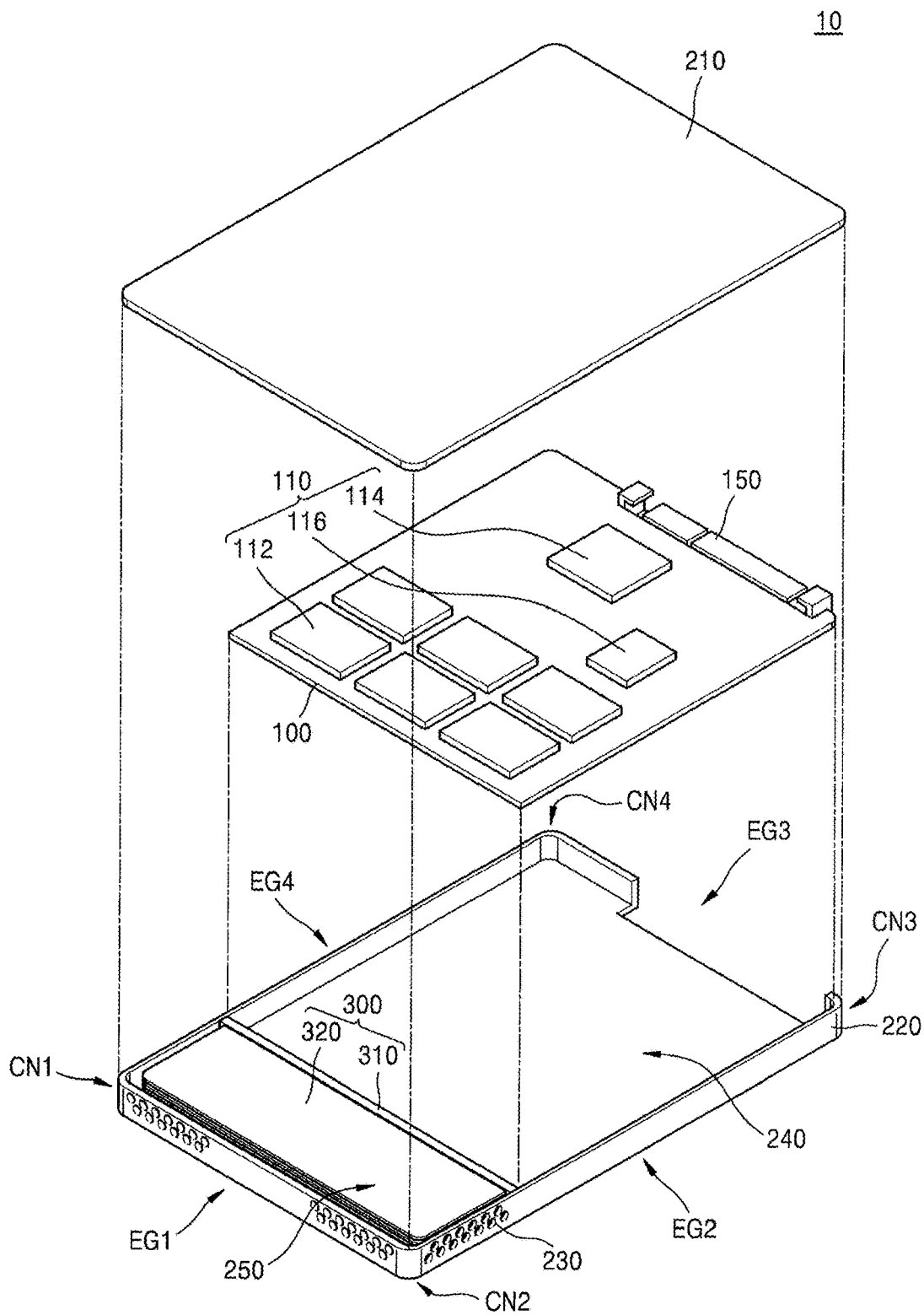
FIG. 2 is a disassembled perspective view of a solid state drive apparatus according to an example embodiment of the inventive concepts.

FIG. 2 is a disassembled perspective view of a solid state drive apparatus 10 according to an example embodiment of the inventive concepts. Description provided with reference to FIGS. 1A and 1B above and also applied to the example embodiment of FIG. 2 may be omitted below.

Referring to FIG. 2, the solid state drive apparatus 10 includes the housing 200 (FIGS. 1A and 1B) the substrate 100, a plurality of semiconductor chips 110 and the heat dissipation member 300 mounted in the housing 200.

The plurality of semiconductor chips 110 may be mounted on one or two surfaces of the substrate 100. The semiconductor chips 110 may be electrically connected to the substrate 100. The plurality of semiconductor chips 110 may include at least one non-volatile memory chip 112, a controller chip 114, and an auxiliary memory chip 116. Multiple ones of each type of chip may be mounted on the substrate 100. Moreover, more than one substrate 100 may be included within the housing 200.

The substrate 100 may be, for example, a printed circuit board. The substrate 100 may include a substrate base and an upper pad (not shown) and a lower pad (not shown) respectively formed on upper and lower surfaces of the substrate base. The upper pad and the lower pad may be each exposed by a solder resist layer (not shown) covering the upper and lower surfaces of the substrate base. The substrate base may be formed of at least one of a phenolic resin, an epoxy resin, and polyimide. For example, the substrate base may include at least one of flame retardant 4 (FR4), tetrafunctional epoxy, polyphenylene ether, epoxy/polyphenylene oxide, bismaleimide triazine (BT), thermount, cyanate ester, polyimide, and liquid crystal polymer. The upper pad and the lower pad may be formed of copper, nickel, stainless steel, or beryllium copper. An internal wiring (not shown) that is electrically connected to the upper pad and/or the lower pad may be formed in the substrate base. The upper pad and the lower pad may include portions of circuit wirings formed by coating an upper surface and a lower surface of the substrate base with copper coil and patterning on the upper and lower surfaces of the substrate base to form circuit wirings, and then exposing portions of the circuit wirings via the solder resist layer. The substrate base may include a plurality of base layers, and the substrate 100 may have layers formed to have wirings on the upper and lower surfaces of the substrate base and between the plurality of base layers. That is, the substrate 100 may have a plurality of layers. The substrate 100 may include, for example, wirings, such as a circuit wiring or heat-conducting wiring formed in the plurality of layers, and the internal wiring, such as a connection wiring connecting the wirings of the plurality of layers.

The non-volatile memory chip 112 may be, for example, a NAND flash memory, a resistive random access memory (RRAM), a magnetoresistive RAM (MRAM), a phase-change RAM (PRAM), or a ferroelectric RAM (FRAM). The non-volatile memory chip 112 may include a single non-volatile memory chip or a semiconductor package in which a plurality of non-volatile memory chips are stacked.

The controller chip 114 may provide an interface and a protocol between a host and the non-volatile memory chip 112. The controller chip 114 may provide standard protocols such as PATA, SATA, SCSI, or PCIe, for interfacing between the non-volatile memory chip 112 and the host. Also, the controller chip 114 may perform, with respect to the non-volatile memory chip 112, wear leveling, garbage collection, bad block management, or error correcting code (ECC) or the like.

The auxiliary memory chip 116 may be a non-volatile memory chip, such as a dynamic RAM (DRAM). The auxiliary memory chip 116 may provide cache so as to scale access time and data transfer performance according to process performance of a system in which the solid state drive apparatus 10 is included.

Active or passive elements, such as a chip resistor, a chip capacitor, inductance, a switch, a temperature sensor, a DC-DC converter, a quartz generating a clock, or a voltage regulator may be further mounted on the substrate 100.

A connector 150 may be attached to an end of the substrate 100. The connector may be connected to an external device to transmit or receive a signal and/or receive power. A plurality of wiring lines (not shown) may be formed in the connector 150. The connector 150 may be a connector configured to be connected to an external device according to, for example, parallel advanced technology attachment (PATA) standards, serial advanced technology attachment (SATA) standards, small computer small interface (SCSI) standards, or PCI Express (PCIe) standards. The SATA standards include not only SATA-1 but any SATA standards such as SATA-2, SATA-3, or e-SATA (external SATA). The PCIe standards include not only PCIe 1.0 but any PCIe standards such as PCIe 2.0, PCIe 2.1, PCIe 3.0, or PCIe 4.0. The SCSI standards include any SCSI standards such as parallel SCSI standards, serial combination SA-SCSI (SAS) standards, or iSCSI standards.

The housing 200 may include the lower housing 220 and the upper housing 210 on the lower housing 220. The housing 200 may have a first accommodation space 240 and a second accommodation space 250 between the upper housing 210 and the lower housing 220. The first accommodation space 240 may be adjacent to the first side EG1, and the second accommodation space 250 may be adjacent to the third side EG3.

The substrate 100 may be mounted in the first accommodation space 240, and the heat dissipation member 300 may be mounted in the second accommodation space 250.

The substrate 100 may be mounted in the first accommodation space 240 such that the connector 150 faces the third side EG3 of the solid state drive apparatus 10. That is, the substrate 100 may be mounted in the first accommodation space 240 such that the connector 150 faces a third lateral side of the housing 200 which is the third side EG3 of the solid state drive apparatus 10.

The heat dissipation member 300 may include an isolation barrier 310 between the first accommodation space 240 and the second accommodation space 250. In particular, the isolation barrier 310 may define a boundary of the second accommodation space 250 with respect to the first accommodation space 240. The heat dissipation member 300 may also include a plurality of fin portions 320 extending from the isolation barrier 310 towards a lateral side of the housing 200. That is, the plurality of fin portions 320 may extend from the isolation barrier 310 towards the lateral side of the housing 200 adjacent the second accommodation space 250. Each of the plurality of fin portions 320 may have a planar shape and be parallel to a main surface of the substrate 100.

The heat dissipation member 300 may be mounted adjacent to an opposite side to the third lateral side of the housing 200, that is, to be adjacent to the first lateral side of the housing 200 which is the first side EG1 of the solid state drive apparatus 10.

The plurality of fin portions 320 may increase a total area of the heat dissipation member 300 in the second accommodation space 250. The heat dissipation member 300 may be formed of a relatively highly thermoconductive metal, for example, copper, aluminum, or a clad metal including these.

In some example embodiments, the heat dissipation member 300 may be formed of a single body. That is, the isolation barrier 310 and the plurality of fin portions 320 of the heat dissipation member 300 may be formed as a single body.

In other embodiments, the isolation barrier 310 and the plurality of fin portions 320 may be separate elements. That is, an isolation barrier 310 may be provided between the first and second accommodation spaces 240, 250, and a separate heat dissipation member including the plurality of fin portions 320 may be provided on the isolation barrier 310.

The isolation barrier 310 separates the first and second accommodation spaces 240 250, so that the substrate 100 and the heat dissipation member 300 are located in substantially different compartments in the housing 200. In other words, the isolation barrier 310 defines the first accommodation space 240 and the second accommodation space 250 to be substantially different compartments of the housing 200. The isolation barrier 310 may substantially reduce or prevent airflow between the first and second accommodation spaces 240, 250. The second accommodation space 250, in which the plurality of fin portions 320 are provided, may be designed to permit airflow therethrough. It may not be desirable to encourage airflow through the first accommodation space 240 in which the electronic circuitry is disposed. However, it is desirable to remove heat from first accommodation space 240. Embodiments of the inventive concepts may promote heat dissipation from the electronic circuitry in the first accommodation space 240 through the isolation barrier 310 and the plurality of fins 320 in the second accommodation space 250 while reducing external airflow into the first accommodation space 240.

The isolation barrier 310 may thermally contact the housing 200, that is, the upper housing 210 and the lower housing 220. In order for the isolation barrier 310 to thermally contact the housing 200, a thermal interface material (TIM) may be provided between the isolation barrier 310 and the housing 200. Alternatively, the isolation barrier 310 and the upper housing 210 and/or the lower housing 220 may be bonded to each other via press fitting or welding.

The plurality of through air holes 230 may be formed in a lateral side of the housing 200 around the second accommodation space 250. That is, the plurality of through air holes 230 may be formed in portions of the first side EG1 and the second and fourth sides EG2 and EG4 of the solid state drive apparatus 10 adjacent to the first side EG1. Thus, the plurality of through air holes 230 may be formed in a lateral side of the housing 200 adjacent to the plurality of fin portions 320.

In some example embodiments, a plurality of through air holes 230 may not be formed in the entire first lateral side of the housing 200, which forms the first side EG1 of the solid state drive apparatus 10, but only in portions of the first lateral side of the housing 200. For example, a plurality of through air holes 230 may be formed in portions of a lateral side of the housing 200 adjacent to the first and second corners CN1 and CN2 at two ends of the first side EG1 of the solid state drive apparatus 10. That is, the plurality of through air holes 230 may be formed in a portion of each of first and fourth lateral sides of the housing 200 that are adjacent to the first corner CN1 and another portion of the first lateral side and a portion of a second lateral side of the housing 200 that are adjacent to the second corner CN2.

When there is a forced convection environment outside the solid state drive apparatus 10, that is, when there is an air flow, the air flow may proceed into the second accommodation space 250 through some of the plurality of through air holes 230. Accordingly, the air flow encountering the fin portions 320 of the heat dissipation member 300 may proceed out of the solid state drive apparatus 10 through some of the other through air holes 230.

Thus, heat generated inside the solid state drive apparatus 10 may be dissipated via both the housing 200 and the heat dissipation member 300. Accordingly, a heat dissipation function of the solid state drive apparatus 10, that is, a cooling function thereof may be increased, even though the air flow does not flow into the first accommodation space 240 from the second accommodation space 250.

In some example embodiments, the isolation barrier 310 may thermally contact the heat-conducting wiring of the substrate 100. Accordingly, heat may be transferred directly from the substrate 100 to the heat dissipation member 300 without passing by the housing 200, thereby improving cooling performance.

Figure 3:
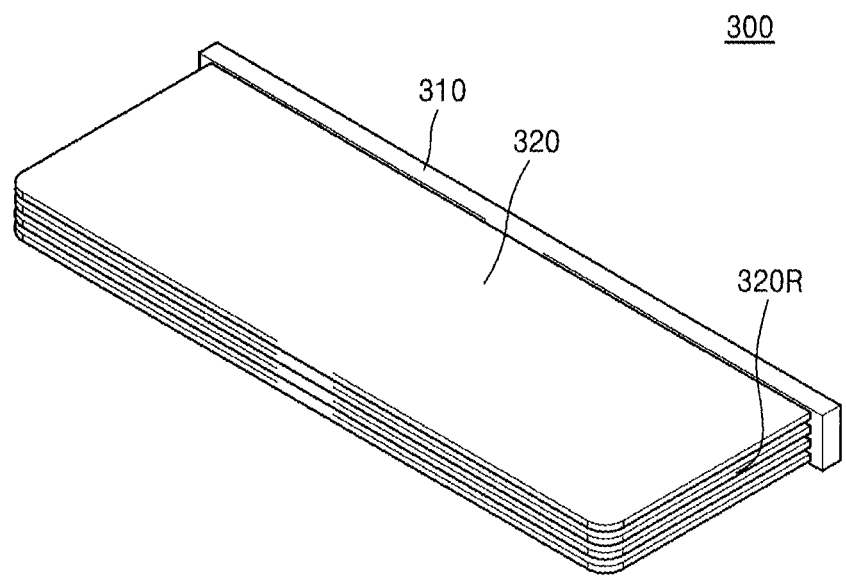
FIG. 3 is an expanded perspective view of a heat dissipation member included in a solid state drive apparatus according to an example embodiment of the inventive concepts.

FIG. 3 is an expanded perspective view of a heat dissipation member 300 included in a solid state drive apparatus according to an example embodiment of the inventive concepts.

Referring to FIGS. 2 and 3, the heat dissipation member 300 may include the isolation barrier 310 provided at a boundary of the second accommodation space 250 with respect to the first accommodation space 240 and the plurality of fin portions 320 extending from the isolation barrier 310 towards a lateral side of the housing 200. That is, the plurality of fin portions 320 may extend from the isolation barrier 310 towards a lateral side of the housing 200 around the second accommodation space 250. Each of the plurality of fin portions 320 may have a planar shape and may be parallel to a main surface of the substrate 100. An open portion 320R may be formed between respective fin portions 320 towards the lateral side of the housing 200. An air flow proceeding into the second accommodation space 250 through some of the through air holes 230 may contact the plurality of fin portions 320 through the open portion 320R and receive heat from the heat dissipation member 300.

Figure 4:
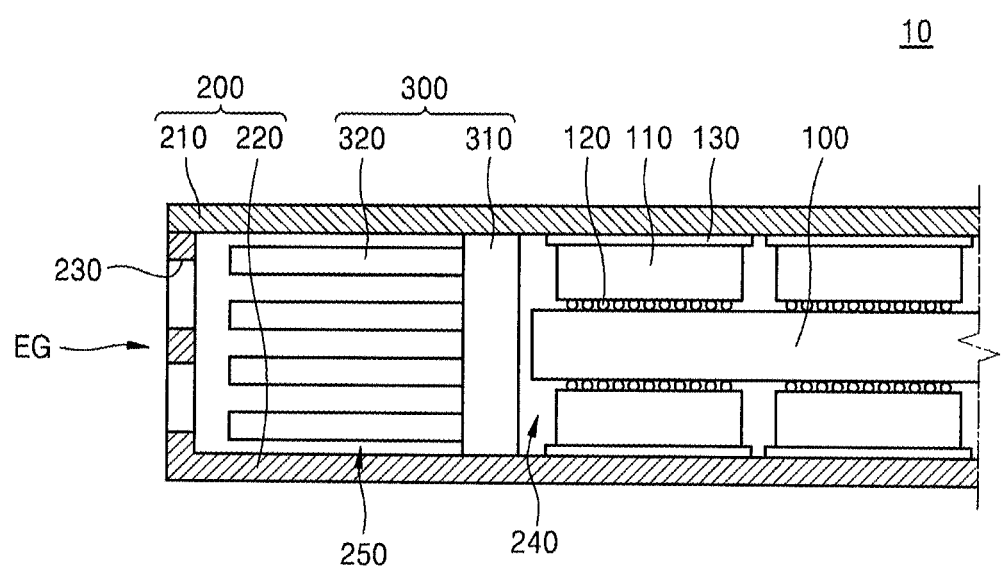
FIG. 4 is a cross-sectional view illustrating major portions of a solid state drive apparatus according to an example embodiment of the inventive concepts.

FIG. 4 is a cross-sectional view illustrating major portions of a solid state drive apparatus according to an example embodiment of the inventive concepts. In detail, FIG. 4 is a cross-sectional view illustrating major portions of the solid state drive apparatus 10 of FIGS. 1A, 1B, and 2B. Description provided with reference to FIGS. 1A through 3 and also applied to the example embodiment of FIG. 4 may be omitted below.

Referring to FIG. 4, the solid state drive apparatus 10 includes the housing 200 the substrate 100, the plurality of semiconductor chips 110 and the heat dissipation member 300 mounted in the housing 200.

The plurality of semiconductor chips 110 may be mounted on one or two surfaces of the substrate 100. The semiconductor chips 110 may be electrically connected to the substrate 100. The plurality of semiconductor chips 110 may include at least one non-volatile memory chip (the non-volatile memory chip 112 of FIG. 2), a controller chip (the controller chip 114 of FIG. 2) and an auxiliary memory chip (the auxiliary memory chip 116 of FIG. 2).

The plurality of semiconductor chips 110 may be electrically connected to the substrate 100 via a connection member 120. The connection member 120 may be, for example, a solder ball or a bump. Alternatively, the plurality of semiconductor chips 110 may be electrically connected to the substrate 100 via a bonding wire. For example, some of the plurality of semiconductor chips 110 may be mounted on the substrate 100 in a flip chip manner so as to be electrically connected to the substrate 100 via the connection member 120 such as a solder ball or a bump, and some other of the semiconductor chips 110 may be mounted on the substrate 100 by using a die attach film (DAF) so as to be electrically connected to the substrate 100 via a bonding wire.

For example, the non-volatile memory chip 112 and/or the controller chip 114 of the plurality of semiconductor chips 110 may be mounted on the substrate 100 in a flip chip manner so as to be electrically connected to the substrate 100 via the connection member 120 such as a solder ball or a bump, and the auxiliary memory chip 116 may be mounted on the substrate 100 by using a DAF so as to be electrically connected to the substrate 100 via a bonding wire, but are not limited thereto.

A thermal interface material (TIM) 130 may be provided on the plurality of semiconductor chips 110. The plurality of semiconductor chips 110 may thermally contact the housing 200 via the TIM 130. Some of the plurality of semiconductor chips 110 may thermally contact the upper housing 210 via the TIM 130, and some others of the plurality of semiconductor chips 110 may thermally contact the lower housing 220 via the TIM 130. The TIM 130 is a material facilitating transfer of heat generated in the plurality of semiconductor chips 110, to the housing 200. The TIM 130 may be, for example, grease, a thermoconductive adhesive, mineral oil, a gap filler putty, a gel or a pad formed of a phase change material, or a particle filled epoxy. Examples of commercially available grease are ShinEtsu G750, ShinEtsu G751, ShinEtsu G765, and Bergquist TIC-7500; examples of the commercially available phase-change material are Thermax HF60110-BT, Chromerics T725, Chromerics T443, Chromerics T454, Thermagon T-pcm 905c, Bergquist 200U, Bergquist HiFlow 225-U, and Bergquist HiFlow 225-UT; and examples of commercially available thermoconductive adhesive are Chromerics therm-A-form T642. However, the TIM 130 is not limited thereto.

The housing 200 may include the lower housing 220 and the upper housing 210 covering the lower housing 220. The housing 200 may have the first accommodation space 240 and the second accommodation space 250 between the upper housing 210 and the lower housing 220. The substrate 100 may be mounted in the first accommodation space 240, and the heat dissipation member 300 may be mounted in the second accommodation space 250.

The heat dissipation member 300 may include the isolation barrier 310 at a boundary of the second accommodation space 250 with respect to the first accommodation space 240 and the plurality of fin portions 320 extending from the isolation barrier 310 towards a side EG of the solid state drive apparatus 10, that is, towards a lateral side of the housing 200. That is, the plurality of fin portions 320 may extend from the isolation barrier 310 towards a lateral side of the housing 200 around the second accommodation space 250. Each of the plurality of fin portions 320 may have a planar shape and be parallel to a main surface of the substrate 100. In some example embodiments, the heat dissipation member 300 may be formed of a single body. That is, the isolation barrier 310 and the plurality of fin portions 320 of the heat dissipation member 300 may be formed as a single body.

The isolation barrier 310 defines the first and second accommodation spaces 240, 250, such that the substrate 100 and the heat dissipation member 300 are located in substantially different compartments in the housing 200. In other words, the isolation barrier 310 provides the effect that the first accommodation space 240 and the second accommodation space 250 are substantially different compartments of the housing 200.

The isolation barrier 310 may thermally contact the housing 200, that is, the upper housing 210 and the lower housing 220. In order for the isolation barrier 310 to thermally contact the housing 200, a TIM may be provided between the isolation barrier 310 and the housing 200. Alternatively, the isolation barrier 310 and the upper housing 210 and/or the lower housing 220 may be bonded to each other via press fitting or welding.

The side EG of the solid state drive apparatus 10 illustrated in FIG. 4 may be a portion of the first side EG1, the second side EG2, or the fourth side EG4 of the solid state drive apparatus 10 adjacent to the plurality of fin portions 320 illustrated in FIGS. 1A, 1B, and 2.

The plurality of through air holes 230 may be formed in a lateral side of the housing 200. The plurality of through air holes 230 may be formed in a lateral side of the housing 200 adjacent to the heat dissipation member 300.

When there is a forced convection environment outside the solid state drive apparatus 10, that is, when there is an air flow, the air flow may proceed into the second accommodation space 250 through some of the through air holes 230. Accordingly, the air flow encountering the fin portions 320 of the heat dissipation member 300 may proceed out of the solid state drive apparatus 10 through some others of the through air holes 230. The forced convection environment may be formed by a cooling fan 1060 illustrated in FIG. 9.

Thus, heat generated inside the solid state drive apparatus 10 and the heat transferred to the housing 200 through the TIM 130 may be dissipated to the outside of the housing 200 through the heat dissipation member 300. Accordingly, a heat dissipation function of the solid state drive apparatus 10, that is, a cooling function thereof, may be increased.

Figure 5:
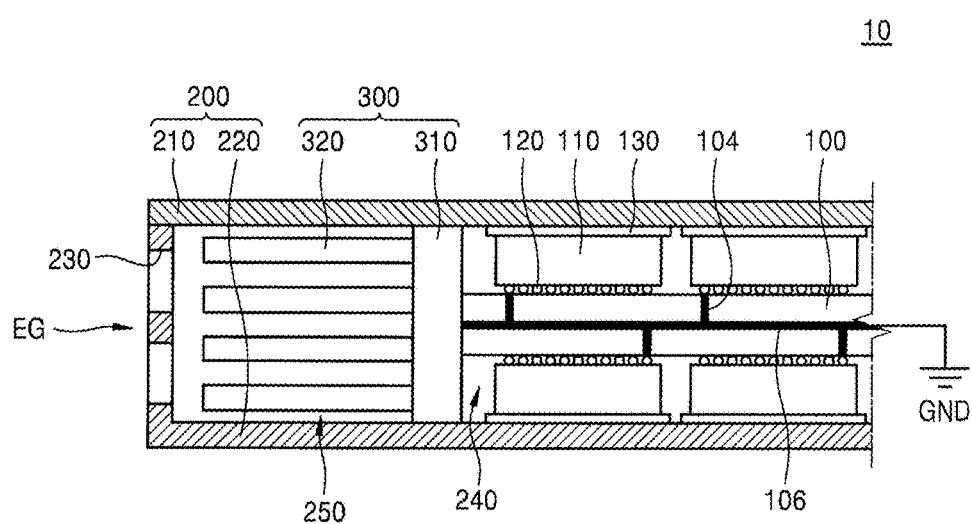
FIG. 5 is a cross-sectional view illustrating major portions of a solid state drive apparatus according to an example embodiment of the inventive concepts.

FIG. 5 is a cross-sectional view illustrating major portions of a solid state drive apparatus according to an example embodiment of the inventive concepts. In detail, FIG. 5 is a cross-sectional view illustrating major portions of the solid state drive apparatus 10 of FIGS. 1A, 1B, and 2B. Description provided with reference to FIGS. 1A through 4 and also applied to the example embodiment of FIG. 5 may be omitted below.

Referring to FIG. 5, the solid state drive apparatus 10 includes the housing 200, the substrate 100, the plurality of semiconductor chips 110 and the heat dissipation member 300 mounted in the housing 200.

The plurality of semiconductor chips 110 may be mounted on one or two surfaces of the substrate 100. The semiconductor chips 110 may be electrically connected to the substrate 100.

The substrate 100 may be, for example, a printed circuit board. The substrate 100 may include a substrate base and an upper pad (not shown) and a lower pad (not shown) respectively formed on upper and lower surfaces of the substrate base. An internal wiring electrically connecting the upper pad and the lower pad may be formed in the substrate base. Some of the internal wiring may be the heat-conducting wiring 104.

The heat dissipation member 300 may contact the substrate 100. In detail, the isolation barrier 310 of the heat dissipation member 300 may thermally contact the heat-conducting wiring 104 in the substrate 100. Accordingly, heat generated inside the solid state drive apparatus 10, for example, in the semiconductor chips 110, may be directly transferred to the heat dissipation member 300 through the substrate 100. In some example embodiments, the heat-conducting wiring 104 may be connected to a ground voltage GND to be grounded.

Figure 6A:
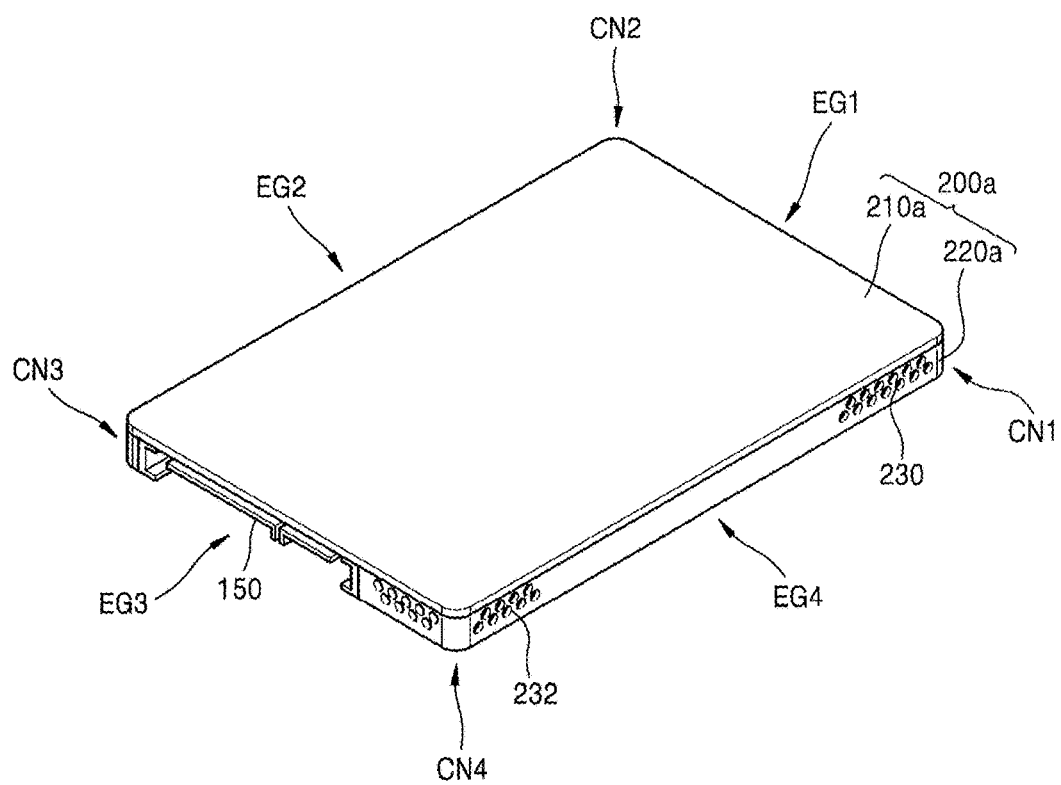
FIG. 6A is a perspective view of a solid state drive apparatus according to an example embodiment of the inventive concepts.
Figure 6B:
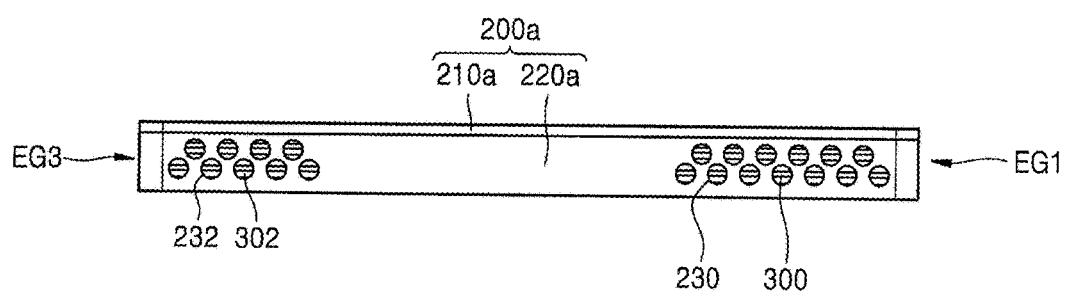
FIG. 6B is a side view of a solid state drive apparatus according to an example embodiment of the inventive concepts.

FIG. 6A is a perspective view illustrating a solid state drive apparatus 10a according to an example embodiment of the inventive concepts. FIG. 6B is a side view of the solid state drive apparatus 10a according to an example embodiment of the inventive concepts. Description provided with reference to FIGS. 1A and 1B and also applied to the example embodiment of FIGS. 6A and 6B may be omitted below.

Referring to FIGS. 6A and 6B, the solid state drive apparatus 10a includes a housing 200a and first and second heat dissipation members 300 and 302 mounted in the housing 200a. The housing 200a may include an upper housing 210a and a lower housing 220a.

A plurality of first through air holes 230 and a plurality of second through air holes 232 may be formed in a lateral side of the housing 200a. The plurality of first through air holes 230 may be formed in a lateral side of the housing 200a adjacent to the first heat dissipation member 300. The plurality of second through air holes 232 may be formed in a lateral side of the housing 200a adjacent to the second heat dissipation member 302.

Figure 7A:
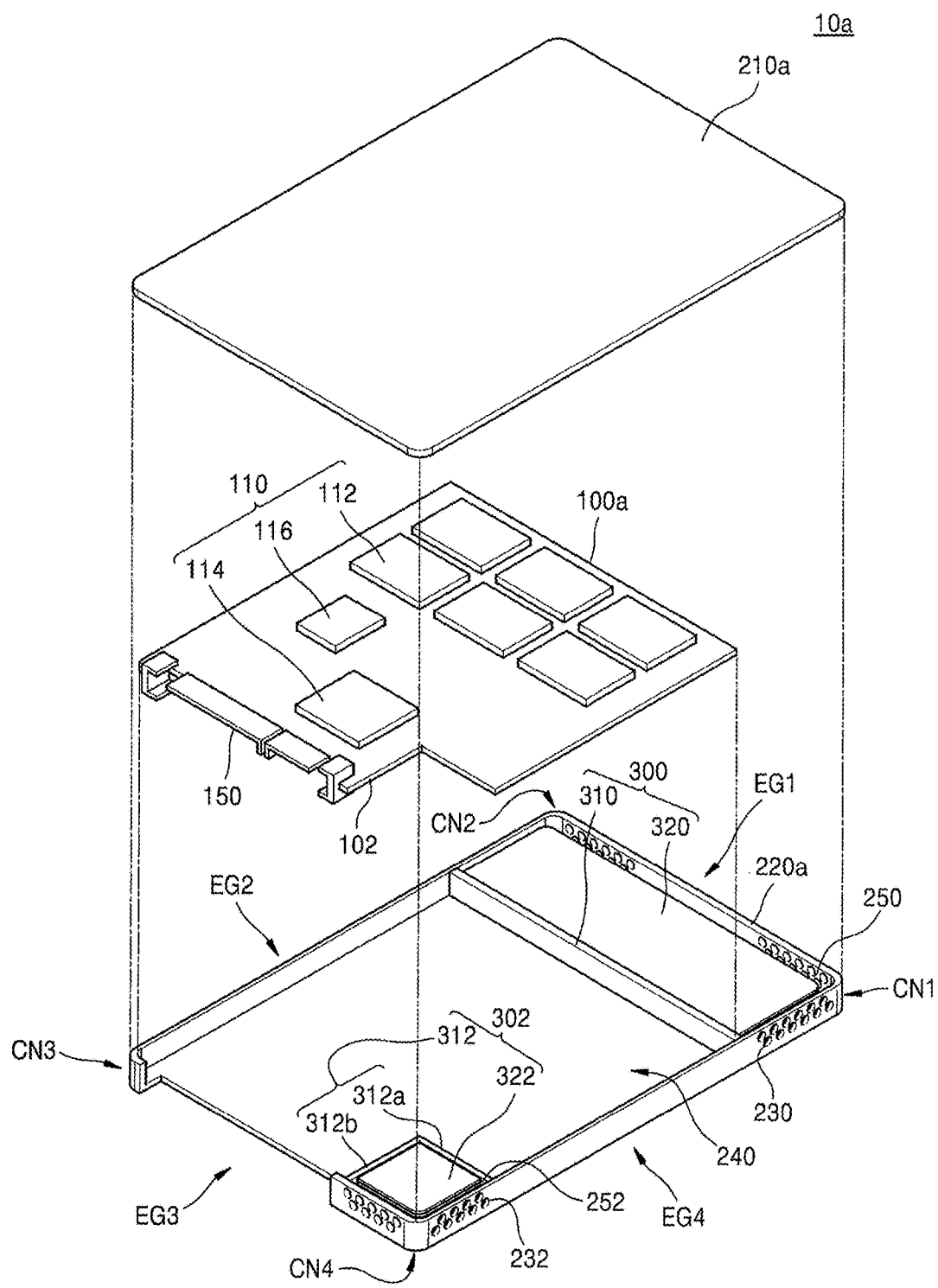
FIG. 7A is a disassembled perspective view of a solid state drive apparatus according to an example embodiment of the inventive concepts.
Figure 7B:
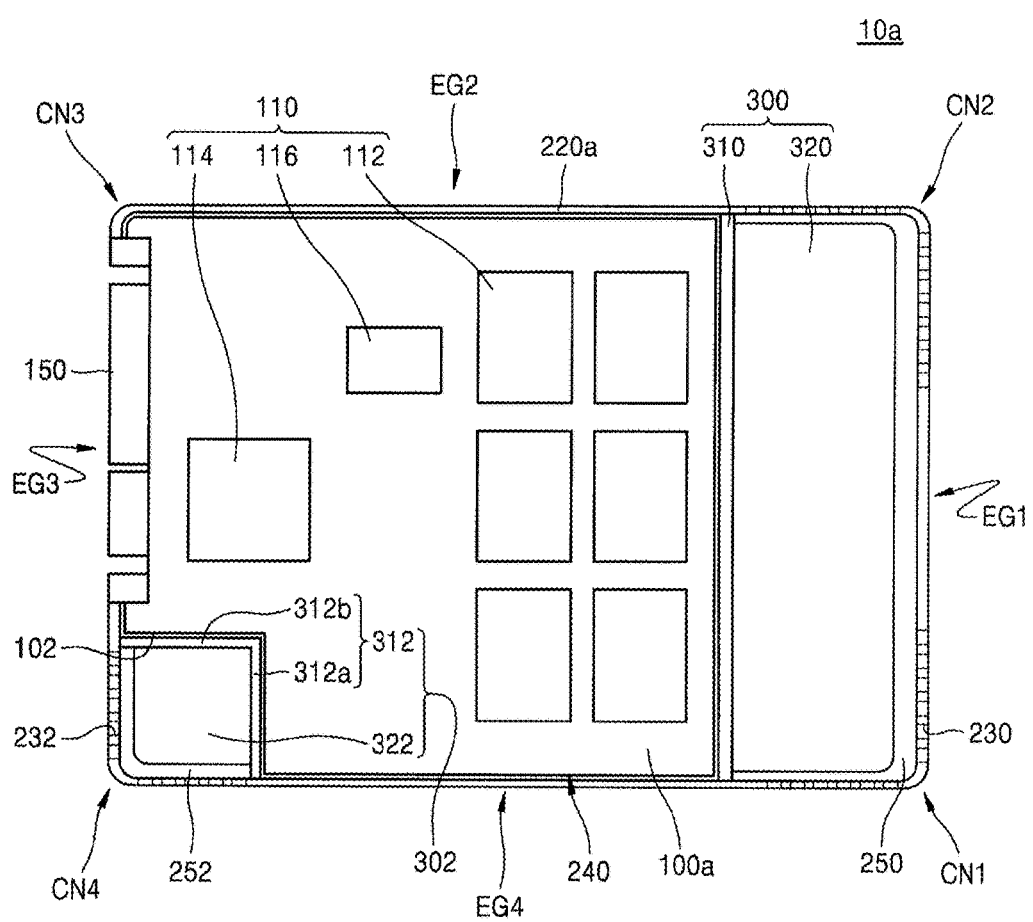
FIG. 7B is a plan view illustrating internal arrangement of a solid state drive apparatus according to an example embodiment of the inventive concepts.

FIG. 7A is a disassembled perspective view of a solid state drive apparatus 10a according to an example embodiment of the inventive concepts. FIG. 7B is a plan view illustrating internal arrangement of the solid state drive apparatus 10a according to an example embodiment of the inventive concepts. Description provided with reference to FIGS. 6A and 6B and also applied to the example embodiment of FIGS. 7A and 7B may be omitted below.

Referring to FIGS. 7A and 7B, the solid state drive apparatus 10a includes the housing 200a (FIGS. 6A and 6B) a substrate 100a mounted in the housing 200a, a plurality of semiconductor chips 110 and the first and second heat dissipation members 300 and 302. In some example embodiments, the first heat dissipation member 300 may be omitted.

The plurality of semiconductor chips 110 may be mounted on one or two surfaces of the substrate 100a. The semiconductor chips 110 may be electrically connected to the substrate 100a. The plurality of semiconductor chips 110 may include at least one non-volatile memory chip 112, a controller chip 114, and an auxiliary memory chip 116.

A connector 150 may be attached to an end of the substrate 100a. A substrate recess 102 may be formed in a portion of the substrate 100a corresponding to a fourth corner CN4.

The housing 200a may include the lower housing 220a and the upper housing 210a covering the lower housing 220a. The housing 200a may include a first accommodation space 240, a second accommodation space 250, and a third accommodation space 252 between the upper housing 210a and the lower housing 220a. The first accommodation space 240 may be adjacent to a first side EG1, and the second accommodation space 250 may be adjacent to a third side EG3, and the third accommodation space 252 may be adjacent to the fourth corner CN4.

The substrate 100a may be mounted in the first accommodation space 240, and the first heat dissipation member 300 may be mounted in the second accommodation space 250, and the second heat dissipation member 302 may be mounted in the third accommodation space 252. The substrate 100a may be disposed in the first accommodation space 240 such that the connector 150 faces the third side EG3 of the solid state drive apparatus 10a.

The first heat dissipation member 300 includes a first isolation barrier 310 and a plurality of first fin portions 320 extending from the first isolation barrier 310. The first heat dissipation member 300 and the plurality of first through air holes 230 are substantially the same as the heat dissipation member 300 and the plurality of through air holes 230 illustrated in FIGS. 1A and 1B, and thus detailed description thereof will be omitted.

The second heat dissipation member 302 may be mounted in the third accommodation space 252 of the housing 200a to be adjacent to the fourth corner CN4 of the solid state drive apparatus 10a. The second heat dissipation member 302 may include a second isolation barrier 312 disposed at a boundary of the third accommodation space 252 with respect to the first accommodation space 240 and a plurality of second fin portions 322 extending from the second isolation barrier 312 towards a lateral side of the housing 200a. That is, the second isolation barrier 312 may define the boundary between the first accommodation space 240 and the third accommodation space 252.

The second isolation barrier 312 may include a first barrier portion 312a and a second barrier portion 312b that extend in different directions and that are connected to each other. For example, the first barrier portion 312a may extend in parallel to the third side EG3, and the second barrier portion 312b may extend in parallel to a fourth side EG4. While the first barrier portion 312a and the second barrier portion 312b may extend perpendicularly to each other, the configuration of these elements is not limited thereto. The third accommodation space 252 may be space at an acute angle between the first barrier portion 312a and the second barrier portion 312b.

The plurality of second fin portions 322 may extend from the second isolation barrier 312 towards a lateral side of the housing 200a around the third accommodation space 252. Each of the plurality of second fin portions 322 is connected to both the first barrier portion 312a and the second barrier portion 312b, and may extend from the first barrier portion 312a and the second barrier portion 312b towards the lateral side of the housing 200a around the third accommodation space 252. Each of the second fin portions 322 may have a planar shape and be parallel to a main surface of the substrate 100a.

The plurality of fin portions 322 may increase a total area of the second heat dissipation member 302 in the third accommodation space 252. The second heat dissipation member 302 may be formed of, for example, copper, aluminum, or a clad metal including these. In some example embodiments, the second heat dissipation member 302 may be formed of a single body. That is, the first barrier portion 312a, the second barrier portion 312b, and the fin portions 322 of the second heat dissipation member 302 may be formed as a single body. In other example embodiments, the first barrier portion 312a, the second barrier portion 312b, and the fin portions 322 of the second heat dissipation member 302 may be separate members.

The second isolation barrier 312 may provide the effect that the substrate 100a and the second heat dissipation member 302 are located in substantially different compartments in the housing 200a. In other words, the second isolation barrier 312 may provide the effect that the first accommodation space 240 and the third accommodation space 252 are substantially different compartments of the housing 200a. Moreover, the second accommodation space 250 and the third accommodation space 252 may be substantially different compartments of the housing 200a.

The second isolation barrier 312 may thermally contact the housing 200a including the upper housing 210a and the lower housing 220a. To enhance a thermal connection between the second isolation barrier 312 and the housing 200a, a TIM may be provided between the second isolation barrier 312 and the housing 200a. Alternatively, the second isolation barrier 312 and the upper housing 210a and/or the lower housing 220a may be bonded to each other via press fitting or welding.

The plurality of second through air holes 232 may be formed in a lateral side of the housing 200a around the third accommodation space 252. That is, the plurality of second through air holes 232 may be formed in portions of the third and fourth sides EG3 and EG4 adjacent to the fourth corner CN4 of the solid state drive apparatus 10a. Thus, the plurality of second through air holes 232 may be formed in a lateral side of the housing 200a adjacent to the plurality of second fin portions 322.

The second heat dissipation member 302 may be mounted in the housing 200a such that the second heat dissipation member 302 is adjacent to the semiconductor chips 110 in which a relatively large amount of heat is generated. For example, the second heat dissipation member 302 may be mounted in the housing 200a to be adjacent to a portion of the substrate 100a on which the controller chip 114 is mounted. The controller chip 114 may be mounted on the substrate 100a to be closer to the connector 150 than the at least one non-volatile memory chip 112. The second heat dissipation member 302 may be mounted in the housing 200a to be adjacent to the third side EG3 of the solid state drive apparatus 10a at which the connector 150 is disposed. Thus, the third accommodation space 252 in which the second heat dissipation member 302 is mounted may be adjacent to the fourth corner CN4 which is an end of the third side EG3.

Although the substrate 100a and the second isolation barrier 312 are illustrated as not contacting each other in FIG. 7B, the example embodiments are not limited thereto. For example, the substrate 100a and the second isolation barrier 312 may contact each other in a similar manner in which the substrate 100 and the isolation barrier 310 of FIG. 5 contact each other. In detail, the second isolation barrier 312 may thermally contact a heat-conducting wiring (not shown) in the substrate 100a in a similar manner in which the isolation barrier 310 thermally contacts the heat-conducting wiring 104 illustrated in FIG. 5.

In some example embodiments, when the first and second isolation barriers 310 and 312 both contact the substrate 100a, the first isolation barrier 310 may thermally contact a first heat-conducting wiring (not shown) connected to the at least one non-volatile memory chip 112, and the second isolation barrier 312 may thermally contact a second heat-conducting wiring (not shown) connected to the controller chip 114. The first and second heat-conducting wirings (not shown) may be connected to a ground voltage to be grounded. In some example embodiments, the first and second heat-conducting wirings may not be connected, but may be separated in the substrate 100a.

Figure 8:
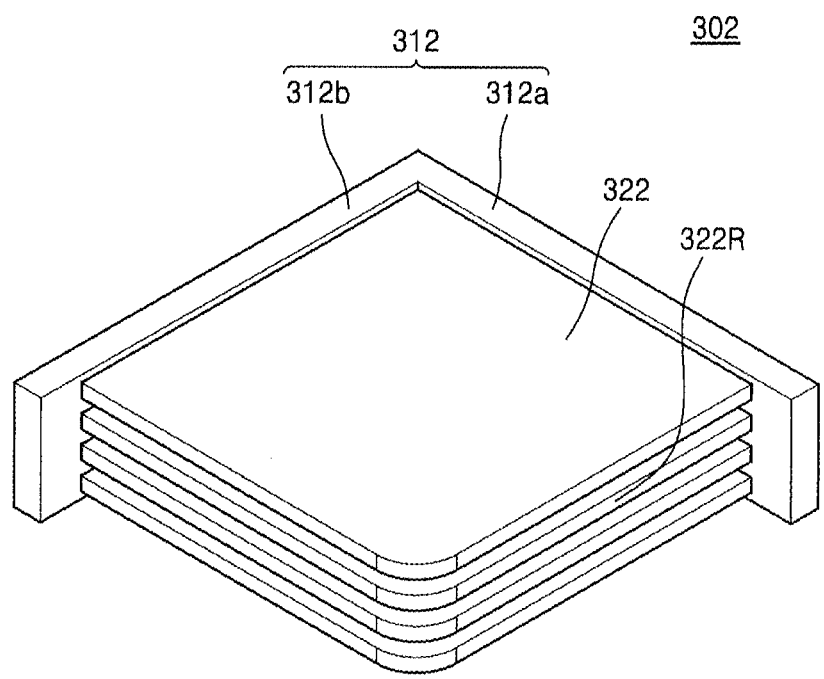
FIG. 8 is an expanded perspective view of a second heat dissipation member included in a solid state drive apparatus according to an example embodiment of the inventive concepts.

FIG. 8 is an expanded perspective view of the second heat dissipation member 302 included in a solid state drive apparatus according to an example embodiment of the inventive concepts.

Referring to FIGS. 7A and 8, the second heat dissipation member 302 may be mounted in the third accommodation space 252. The second heat dissipation member 302 may include the second isolation barrier 312 and the plurality of second fin portions 322 extending from the second isolation barrier 312 towards a lateral side of the housing 200a. The second isolation barrier 312 may be provided at a boundary of the third accommodation space 252 with respect to the first accommodation space 240. In some embodiments, the second isolation barrier 312 may define a boundary between the third accommodation space 252 and the first accommodation space 240.

The second isolation barrier 312 may include the first barrier portion 312a and the second barrier portion 312b that extend in different directions and that are connected to each other. While the second barrier portion 312a and the second barrier portion 312b may extend perpendicularly to each other, they are not limited thereto.

The second fin portions 322 may extend from the second isolation barrier 312 towards a lateral side of the housing 200a around the third accommodation space 252. Each of the fin portions 322 is connected to both the first barrier portion 312a and the second barrier portion 312b, and may extend from the first barrier portion 312a and the second barrier portion 312b towards a lateral side of the housing 200a around the third accommodation space 252. Each of the plurality of second fin portions 322 may have a planar shape and be parallel to a main surface of the substrate 100a. An open portion 322R may be formed towards a lateral side of the housing 200a between respective second fin portions 322. An air flow proceeding into the third accommodation space 252 through some of the second through air holes 232 may contact the plurality of second fin portions 322 through the open portion 322R to receive heat from the second heat dissipation member 302.

Figure 9:
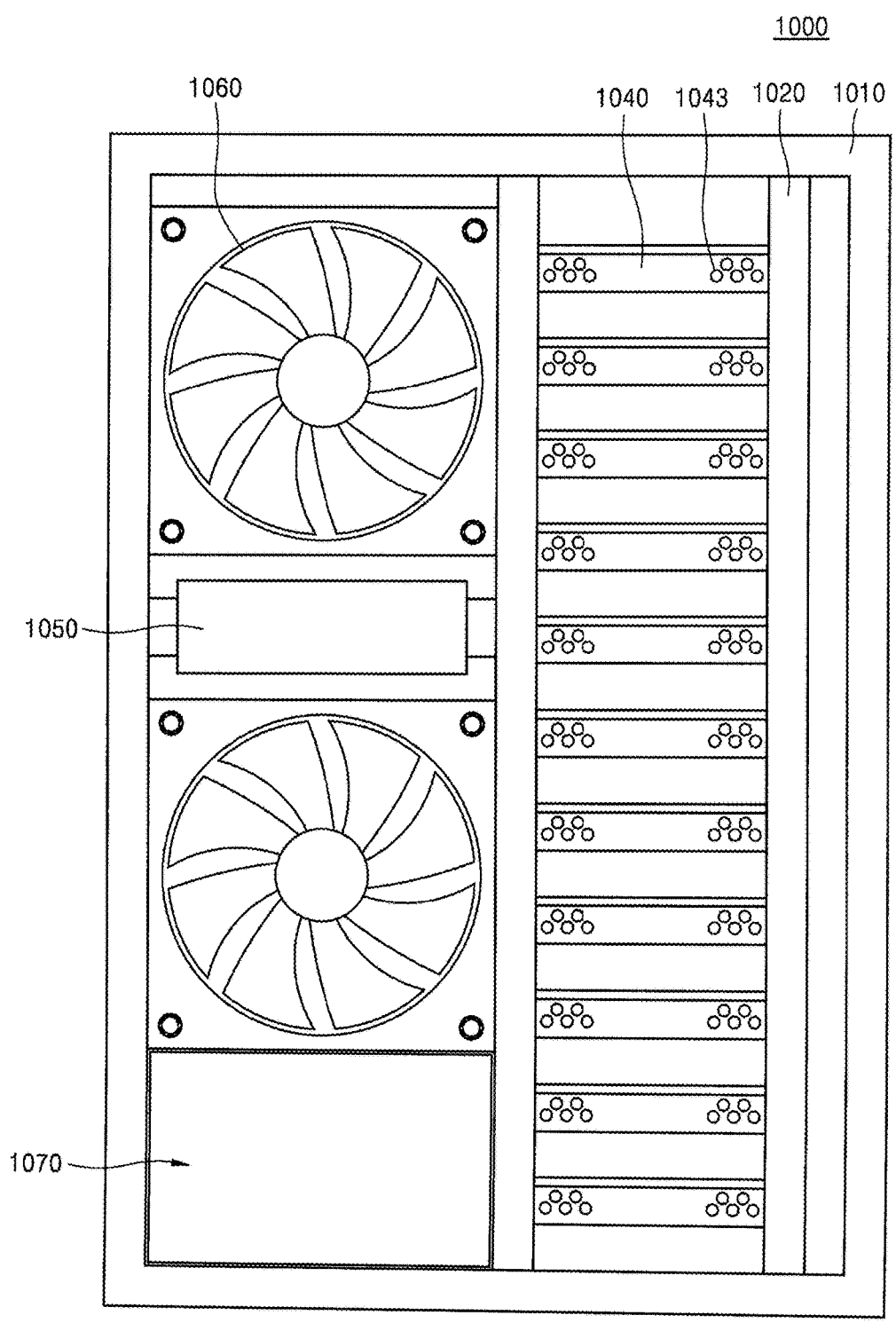
FIG. 9 is a structural diagram illustrating a system according to an example embodiment of the inventive concepts.

FIG. 9 is a structural diagram illustrating a system 1000 according to an example embodiment of the inventive concepts.

Referring to FIG. 9, the system 1000 may include a case 1010, a rack 1020 in which a plurality of solid state drive apparatuses 1040 are mounted, a management device unit 1050, and a power supply unit 1070. The solid state drive apparatuses 1040 may be one of the solid state drive apparatuses 10 and 10a described with reference to FIGS. 1 through 8.

The system 1000 may further include a cooling fan 1060 providing a forced convection environment therein. An air flow formed in the system 1000 via the cooling fan 1060 may cool the solid state drive apparatuses 1040 through a through air hole 1043 formed in the solid state drive apparatuses 1040.

The power supply unit 1070 may supply power needed for the solid state drive apparatuses 1040, the management device unit 1050, and the cooling fan 1060 in the system 1000.

The system 1000 may be a data storage system such as a network-attached storage (NAS).

Figure 10:
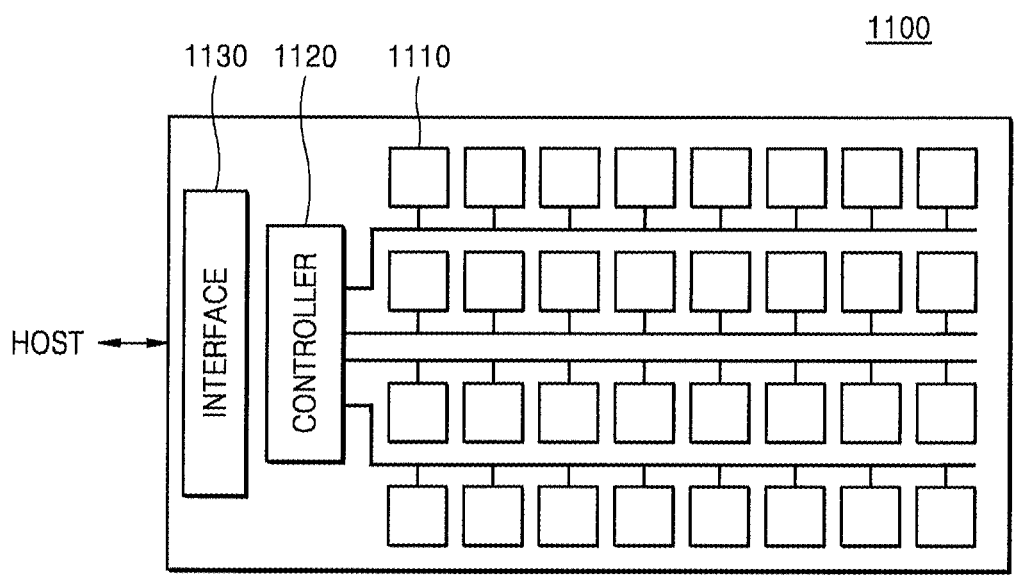
FIG. 10 is a structural diagram illustrating a solid state drive apparatus according to example embodiments of the inventive concepts.

FIG. 10 is a structural diagram of a solid state drive apparatus 1100 according to example embodiments of the inventive concepts.

Referring to FIG. 10, the solid state drive apparatus 1100 includes a plurality of non-volatile memories 1110 and a controller 1120. The non-volatile memories 1120 may store data, and may have non-volatile characteristics of retaining stored data even if power supply is stopped. The solid state drive apparatus 1100 may be one of the solid state drive apparatuses 10 and 10*a* described with reference to FIGS. 1 through 8.

The controller 1120 may read data stored in the non-volatile memories 1110 or store data in the non-volatile memories 1110 in response to a request for reading or writing of a host HOST. An interface 1130 may transmit or receive a command and an address signal to or from the host HOST, and may again transmit or receive a command and an address signal to or from the non-volatile memories 1110 via the controller 1120.

The solid state drive apparatus 1100 may further include an active element or a passive element such as a resistor, a capacitor, inductance, a switch, a temperature sensor, a DC-DC converter, a quartz generating a clock, or a voltage regulator.

Figure 11:
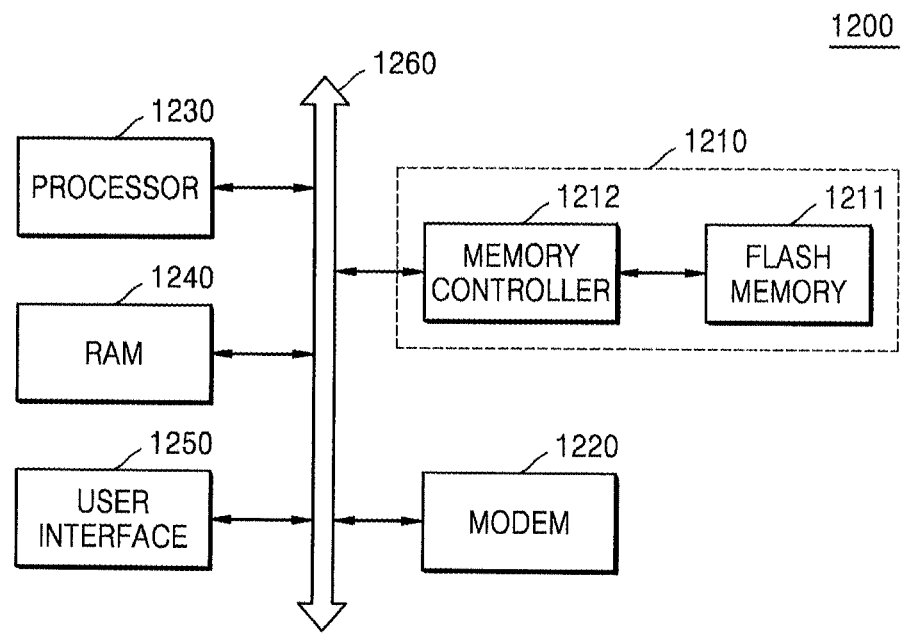
FIG. 11 is a block diagram of a system according to an example embodiment of the inventive concepts.

FIG. 11 is a block diagram of a system 1200 according to an example embodiment of the inventive concepts.

Referring to FIG. 11, the system 1200 may include a processor 1230 such as a CPU, a random access memory (RAM) 1240, a user interface 1250, and a modem 1220 that communicate with one another via a common bus 1260. The elements above may transmit or receive a signal to or from a storage device 1210 via a common bus 1260. The storage device 1210 may include a flash memory 1211 and a memory controller 1212. The flash memory 1211 may store data, and may have non-volatile characteristics of retaining stored data even if power supply is stopped. The storage device 1210 may be one of the solid state drive apparatuses 10 and 10*a* described with reference to FIGS. 1 through 8.

Figure 12:
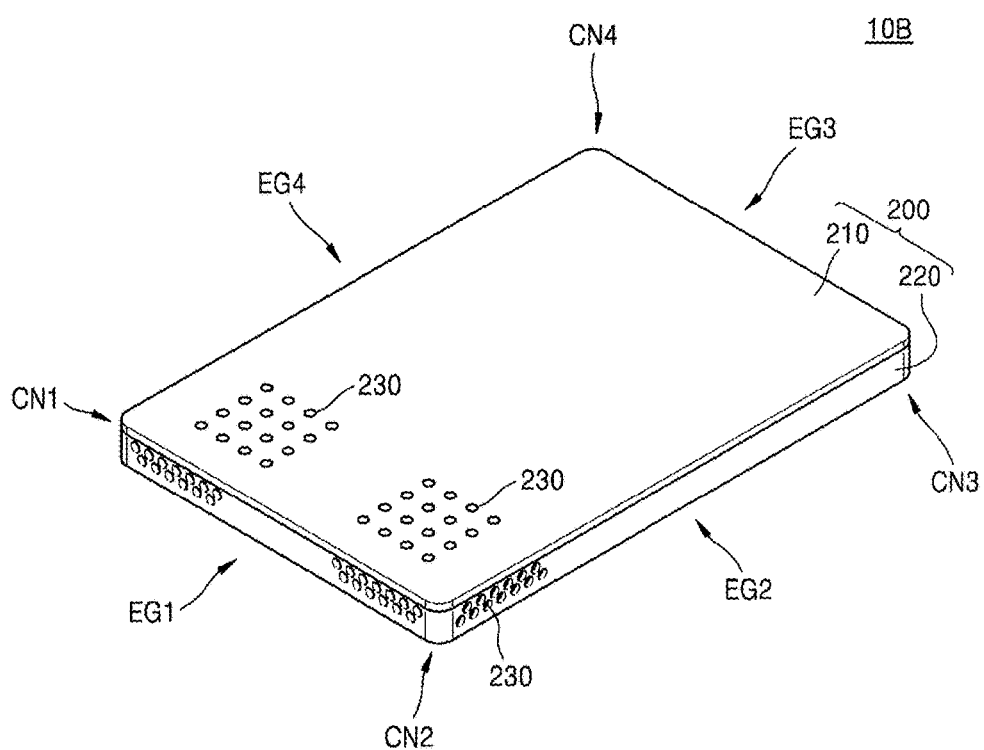
FIG. 12 is a perspective view of a solid state drive apparatus according to further embodiments of the inventive concepts.

FIG. 12 is a perspective view of a solid state drive apparatus 10B according to further embodiments of the inventive concepts. In the embodiments illustrated in FIG. 12, a plurality of through air holes 230 are provided in a top surface of the upper housing 210 above the second accommodation space 250. While not illustrated in FIG. 12, a plurality of through air holes 230 may also be provided in a bottom surface of the lower housing 220 beneath the second accommodation space 250. The through air holes 230 in the upper and lower surfaces of the housing 200 may be provided instead of or in addition to the through air holes 230 in the sidewalls of the housing 200.

Figure 13:
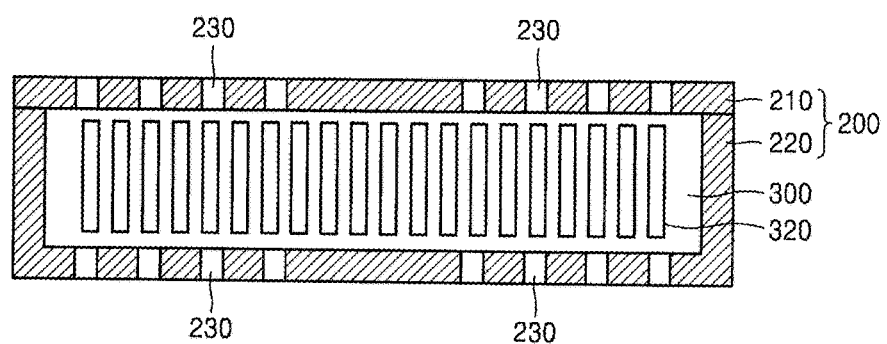
FIG. 13 is a cross-sectional view illustrating portions of a solid state drive apparatus according to further embodiments of the inventive concepts.

FIG. 13 is a cross-sectional view illustrating major portions of a solid state drive apparatus according to further embodiments of the inventive concepts. In the embodiments of FIG. 13, the fin portions 320 of the heat dissipation member 300 may be oriented in a vertical arrangement such that they are perpendicular to the top and bottom surfaces of the housing 200, and are parallel to the lateral sides of the housing 200. This arrangement may enhance airflow from through air holes 230 that are provided in the top and bottom surfaces of the housing 200 as illustrated in FIG. 12.

Figure 14A:
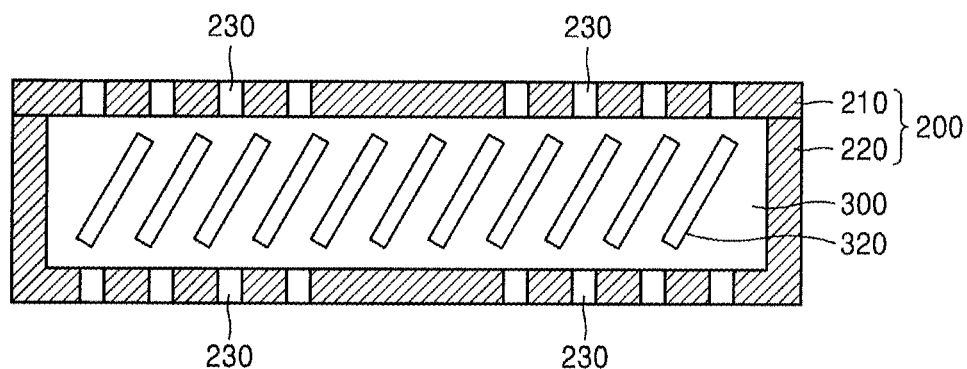
FIGS. 14A to 14C are cross-sectional view illustrating portions of a solid state drive apparatus according to various embodiments of the inventive concepts.
Figure 14B:
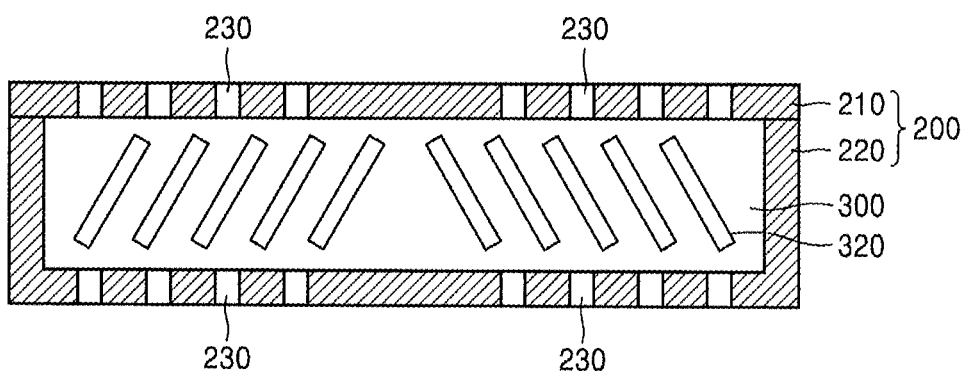
Figure 14C:
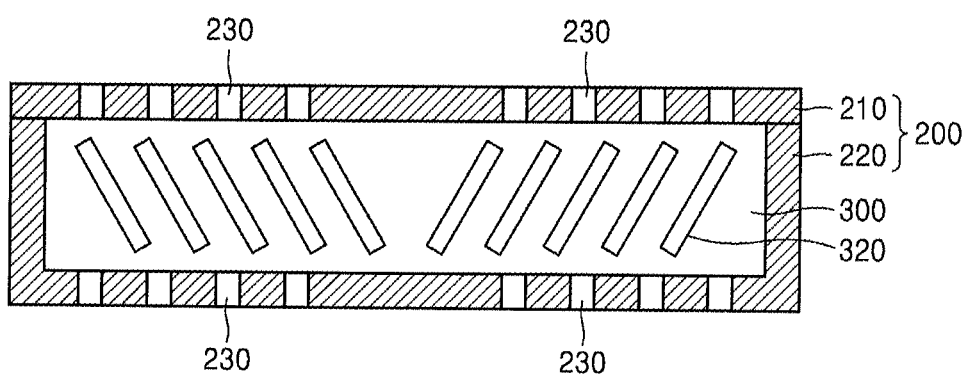

The orientation of the fin portions 320 is not limited to the vertical or horizontal arrangements illustrated, for example, in FIG. 4 and FIG. 12. For example, as illustrated in FIGS. 14A to 14C, the fin portions may be oriented at oblique angles to the top, bottom and sides of the housing 200. For example, in the embodiments illustrated in FIG. 13A, all of the fin portions 320 are angled in a first direction. In FIGS. 14B and 14C, some of the fin portions are angled inward, while others of the fin portions are angled outward with respect to the lateral sides of the housing 200.

While the inventive concepts has been particularly shown and described with reference to example embodiments thereof, it will be understood that various changes in form and details may be made therein without departing from the spirit and scope of the following claims.

What is claimed is:

1. A solid state drive apparatus comprising:
 a housing;
 a barrier extending between and thermally coupled to upper and lower walls of the housing and defining first and second accommodation spaces in the housing separated by the barrier;
 a plurality of fins extending from the barrier into the second accommodation space;
 a substrate in the first accommodation space;
 a non-volatile memory chip and a controller chip on the substrate; and
 a connector mechanically attached at an edge of the substrate, electrically coupled to the controller chip and externally accessible at a side of the housing.

2. The solid state drive apparatus of claim 1, wherein at least one of the non-volatile memory chip and the controller chip thermally contacts the housing.

3. The solid state drive apparatus of claim 1, wherein the housing has plurality of holes provided in a lateral side of the housing adjacent to the second accommodation space.

4. The solid state drive apparatus of claim 1, wherein the substrate comprises a heat-conducting wiring, and
 wherein the heat-conducting wiring of the substrate is in thermal contact with the barrier.

5. The solid state drive apparatus of claim 4, the heat-conducting wiring of the substrate is electrically grounded.

6. The solid state drive apparatus of claim 1, wherein each of the plurality of fins has a planar shape and is parallel to a main surface of the substrate.

7. A solid state drive apparatus comprising:
 a housing comprising an upper housing and a lower housing;
 a printed circuit board (PCB) in the housing;
 a non-volatile memory chip and a controller chip on the PCB; and
 a connector mechanically attached at a first edge of the PCB and electrically coupled to an interface between the non-volatile memory chip and an external device via the controller chip, and
 a heat dissipator in the housing and comprising:
  a barrier extending between the upper housing and the lower housing, thermally contacting the upper housing the lower housing and having a first side facing a second edge of the PCB; and
  a plurality of fins extending from a second side of the barrier.

8. The solid state drive apparatus of claim 7, at least one of the non-volatile memory chip and the controller chip is thermally coupled to the housing via a thermal interface material.

9. The solid state drive apparatus of claim 7, wherein the housing has a plurality of holes provided in a lateral side of the housing and configured to permit air flow between an inner space of the housing and the outside of the housing.

10. The solid state drive apparatus of claim 7, wherein each of the plurality of fins has a planar shape and is parallel to a main surface of the PCB, and edges of the plurality of fins face the lateral side of the housing.

11. The solid state drive apparatus of claim 7, wherein the PCB comprises a heat-conducting wiring,
wherein the heat dissipator thermally contacts the heat-conducting wiring of the PCB.

12. A solid state drive apparatus comprising:
a housing comprising an upper housing and a lower housing;
a printed circuit board (PCB) in the housing;
a plurality of semiconductor chips comprising a non-volatile memory chip and a controller chip and having first sides electrically bonded to the PCB, the plurality of semiconductor chips thermally coupled to the housing by thermal interface material interposed between second sides of the semiconductor chips and the housing;
a connector mechanically attached at an edge of the PCB and electrically coupled to interface with the non-volatile memory chip and a host; and
a heat dissipator comprising a plurality of fins in the housing and thermally coupled to the housing such that heat from the semiconductor chips is dissipated via a thermal path including the thermal interface material, the housing and the heat dissipator.

13. The solid state drive apparatus of claim 12, wherein the heat dissipator has a plurality of fins are in contact with an air flow.

14. The solid state drive apparatus of claim 13, wherein the heat dissipator further comprises a barrier extending between the upper housing and the lower housing and separating an inner space of the housing into first and second accommodation spaces,
wherein the PCB is in the first accommodation space,
wherein the plurality of fins extend from the barrier into the second accommodation space, and
wherein the barrier is configured to block air flow between the first accommodation space and the second accommodation space.

15. The solid state drive apparatus of claim 12, wherein the housing comprises a plurality of holes configured to permit air flow between an inner space of the housing and the outside of the housing.

16. The solid state drive apparatus of claim 15, wherein the plurality of holes is provided in a lateral side of the housing, and wherein the plurality of fins is adjacent to the lateral side of the housing.

17. The solid state drive apparatus of claim 16, wherein the plurality of fins are spaced apart from each other with an open portion provided therebetween, and the plurality of fins are configured to contact air flow flowing through the open portion.

18. The solid state drive apparatus of claim 15, wherein the plurality of holes comprises:
a plurality of first holes provided in a lateral side of the housing; and
a plurality of second holes provided in at least one of a top potion of the housing and a bottom portion of the housing.

* * * * *